Aug. 19, 1924.
H. GIBBS
HOSE RACK
Filed Aug. 18, 1921
1,505,330
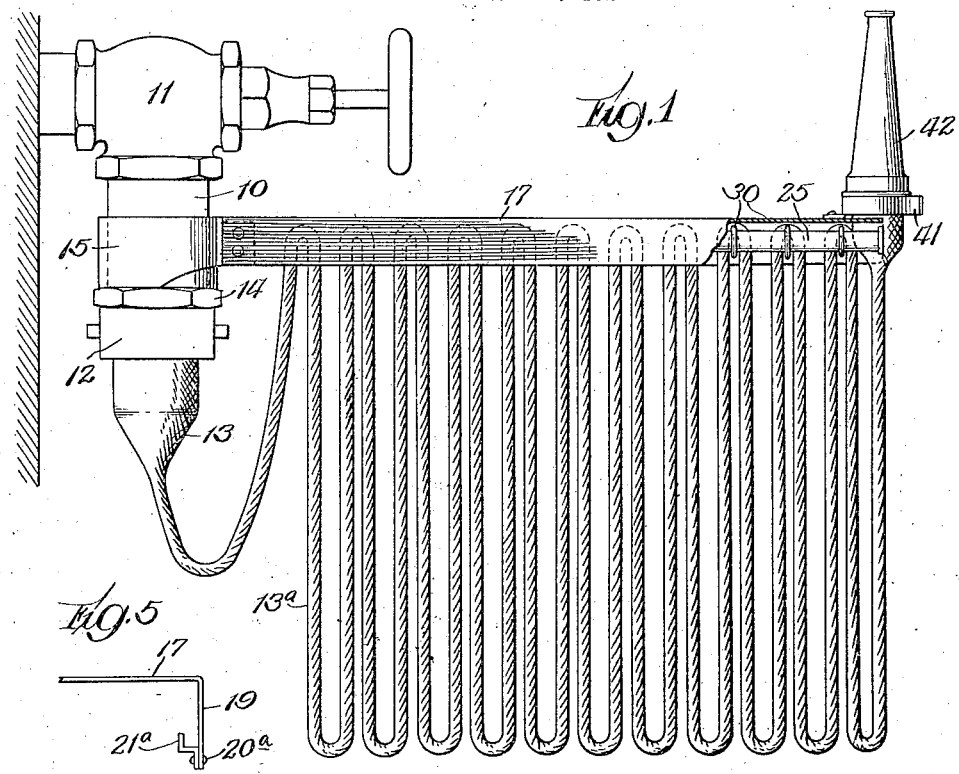
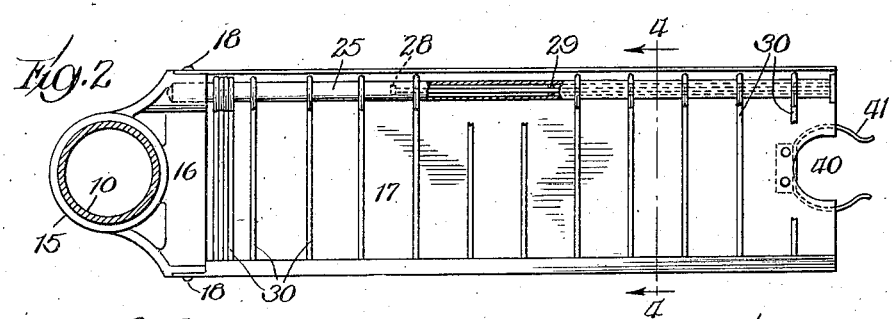
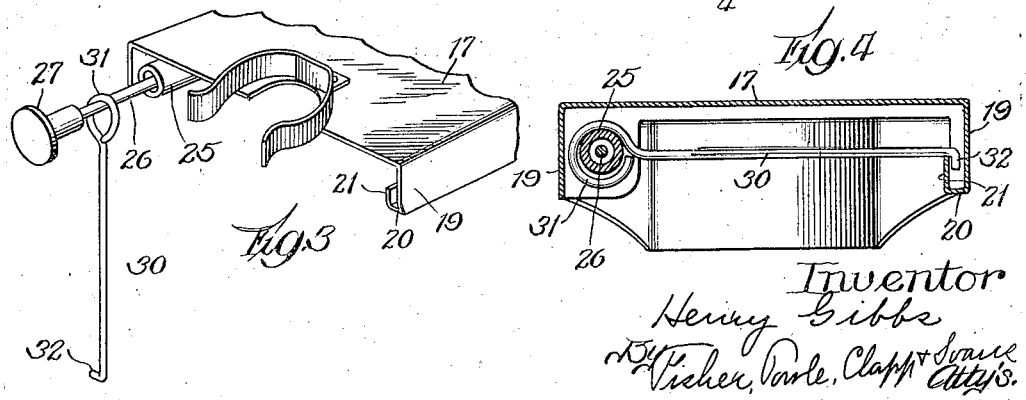
Inventor
Henry Gibbs
By Fisher, Poole, Clapp & Soans Atty's.

Patented Aug. 19, 1924.

1,505,330

UNITED STATES PATENT OFFICE.

HENRY GIBBS, OF CHICAGO, ILLINOIS, ASSIGNOR TO W. D. ALLEN MANUFACTURING COMPANY, OF CHICAGO, ILLINOIS, A CORPORATION.

HOSE RACK.

Application filed August 18, 1921. Serial No. 493,332.

*To all whom it may concern:*

Be it known that I, HENRY GIBBS, a citizen of the United States, and a resident of Chicago, in the county of Cook and State of Illinois, have invented certain new and useful Improvements in Hose Racks, of which I do declare the following to be a full, clear, and exact description, reference being had to the accompanying drawing, forming a part of this specification.

This invention has relation to that class of hose racks designed for suspending fire hose in a series of folds or loops in such manner that as the hose is drawn from the rack the loops are successively released from their supports. More particularly, the invention relates to an improvement upon the hose rack set forth in Letters Patent No. 903,538, granted to W. D. Allen Manufacturing Company as the assignee of C. F. Bowes November 10, 1908.

The invention consists in the features of novelty hereinafter described, illustrated in the accompanying drawing and particularly pointed out in the claim at the end of this specification.

Figure 1 is a view in side elevation (part being broken away) of my improved hose rack. Fig. 2 is an inverted plan view of the rack. Fig. 3 is a perspective view of the end portion of the rack. Fig. 4 is a view in vertical cross section on the line 4—4 of Fig. 2. Fig. 5 is a view showing a portion of the rack cover illustrating a modification of the invention.

In the drawing, 10 designates the water supply pipe that is shown as provided with the usual supply valve within a casing 11. At the lower end of the supply pipe 10 is a coupling 12 to which the hose 13 is attached. Above the coupling 12 and suitably threaded on to the supply pipe 10 is a threaded nut or collar 14 upon which rests a cylindrical portion or collar 15 of the hose rack head 16. This cylindrical portion 15 encircles the supply pipe 10 and is revoluble thereon so that the rack may be swung to either side, according to the direction in which the hose is to be drawn. The hose-rack head 16, with its cylindrical collar or portion 15, is preferably formed as a single casting, and to the head 16 is connected the cover 17 of the rack. This cover 17 is preferably formed of sheet metal of inverted channel shape, the inner end of the cover being suitably attached, as by rivets 18, to the rack head 16. By reference more particularly to Figs. 3 and 4 of the drawing, it will be seen that one of the depending flanges 19 of the cover 17 is formed with inwardly and upwardly turned flanges 20 and 21, the flange 21 being spaced from the flange 19 so as to form a guide way, for a purpose to be presently stated.

Within a socket formed in the hose rack head 16 is secured the inner end of a tubular rod or support 25 and within this rod is mounted in manner free to slide an extension support or rod 26 having a head 27 at its outer end and having its inner end provided with a suitable enlargement 28 adapted to engage with a stop 29 to prevent the complete withdrawal or disengagement of the rod 26 from the tube 25.

Upon the tubular rod or support 25 are slidably mounted the hose-carrying cross pins 30 whereby the loops of hose 13ᵃ are sustained. Each of these pins 30 is formed at one end with an eye 31 adapted to loosely encircle the rod 25, and at its opposite end with a bent portion 32 adapted to enter the groove or passageway between the flanges 19 and 21 of the cover 17. The bent or offset portions 32 of the pins 30 serve to retain the cross pins in general transverse position upon the rack and prevent their accidental disengagement from the flange or support 21 whereon the free ends of the pins rest.

Hose racks of this character are frequently inclosed within casings fitting against one of the walls of the building, so that it is desirable to enable the rack to be made as narrow as possible, and by providing the rack with a tubular rod at one side only to be engaged by the eyes of the pins 30, while the opposite ends of the pins are sustained by a support connected to the depending flange of the cover, the rack may be made considerably narrower and at less expense than the construction set forth in the Bowes patent No. 903,538 above referred to.

Preferably, the outer end of the cover 17 of the rack is cut away, as at 40, and adjacent this cut away space is secured a spring loop 41 whereby the nozzle 42 of the hose may be supported, as shown in Fig. 1 of the drawings.

In practice, the hose will be suspended in loops from the pins 30, as shown in Fig. 1 of the drawings. When it is desired to withdraw the hose, the nozzle 42 will be removed and the hose will be drawn outward from the rack. As the hose is thus drawn outward, the outermost pin 30 will engage with the head 27 of the extension rod 26 and will draw it to the position shown in Fig. 3 of the drawings. At the same time, the free end of the pin 30 will pass from engagement with the flange support 21 of the cover at its outer end and the pin will drop to the position shown in Fig. 3, thereby permitting the loop of hose to fall. In like manner, each of the succeeding pins 30 will be drawn from the tubular rod 25 on to the extension rod 26 and will be disengaged from the flange 21.

Instead of forming the flanges 20 and 21 as an integral part of the cover 17, as illustrated in Figs. 3 and 4 of the drawings, these flanges 20 and 21 may be formed separately from the cover, as illustrated in Fig. 5. By reference to Fig. 5 it will be seen that a Z-shaped bar of metal 21ª is riveted, as at 20ª, to the depending flange 19 of the cover 17, this bar 21ª serving to form the support and guideway for the free ends of the hose-supporting pins 30.

While I have described what I regard as the preferred embodiment of my invention, I wish it understood that the precise details of construction above set out may be varied without departure from the invention and that features of the invention may be employed without its adoption as an entirety.

Having thus described my invention, what I claim as new and desire to secure by Letters Patent is—

A hose rack of the character described comprising a head, a channel-shaped cover connected to said head, a pair of side supports arranged beneath said cover, one of said side supports comprising an up-standing flange rigidly secured upon the inside of said cover, and hose carrying pins slidably and permanently connected to the other of said side supports and having down-turned, hooked ends slidably engaging said supporting flange and releasable from the outer end thereof as the pins are moved outwardly by withdrawal of the hose.

HENRY GIBBS.